(12) United States Patent
Hu et al.

(10) Patent No.: US 11,035,528 B2
(45) Date of Patent: Jun. 15, 2021

(54) LIGHT EMITTING DEVICE WITH DIFFUSER AND LIGHT REFLECTOR AND PROJECTION SYSTEM HAVING THE SAME

(71) Applicant: APPOTRONICS CORPORATION LIMITED, Shenzhen (CN)

(72) Inventors: Fei Hu, Shenzhen (CN); Yi Li, Pleasanton, CA (US); Yi Yang, Shenzhen (CN); Liangliang Cao, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 209 days.

(21) Appl. No.: 15/997,663

(22) Filed: Jun. 4, 2018

(65) Prior Publication Data

US 2019/0137054 A1 May 9, 2019

Related U.S. Application Data

(62) Division of application No. 14/362,756, filed as application No. PCT/CN2012/080411 on Aug. 21, 2012, now Pat. No. 9,989,202.

(30) Foreign Application Priority Data

Dec. 4, 2011 (CN) .......................... 201110396392.4

(51) Int. Cl.
```
F21K 9/65       (2016.01)
G03B 21/20      (2006.01)
F21V 13/08      (2006.01)
```
(52) U.S. Cl.
CPC ................ *F21K 9/65* (2016.08); *F21V 13/08* (2013.01); *G03B 21/204* (2013.01); *G03B 21/2033* (2013.01); *G03B 21/2066* (2013.01)

(58) Field of Classification Search
CPC .......... F21V 7/0033; F21V 7/045; F21V 7/08; F21V 7/09; F21V 2200/17;
(Continued)

(56) References Cited

U.S. PATENT DOCUMENTS 4,853,542 A * 8/1989 Milosevic ............ G01N 21/474
                                                    250/353
5,309,339 A    5/1994 Webb
(Continued)

FOREIGN PATENT DOCUMENTS

CN    1128063 A     7/1996
CN    101815376 A   8/2010
(Continued)

OTHER PUBLICATIONS

Chinese Office Action, dated Aug. 6, 2013 and Search Report, dated Jul. 29, 2013 in a counterpart Chinese patent application, No. CN 201110396392.4.

(Continued)

*Primary Examiner* — Rajarshi Chakraborty
*Assistant Examiner* — Steven Y Horikoshi
(74) *Attorney, Agent, or Firm* — Chen Yoshimura LLP

(57) ABSTRACT

A light emitting device comprises a coherent source generating coherent light, a diffusing element, and a light guide part. The diffusing element includes first and second surfaces opposite to each other, and disperses the coherent light from the coherent source to generate incoherent light. The light guide part is provided on the side of the first surface of the diffusing element; it guides the coherent light emitting from the coherent source to be incident on the first surface to form a first light path, guides a part of incoherent light emitting from the first surface to emit through the first light path, guides the remaining incoherent light to emit through a second light path, and separates the first and second light
(Continued)

paths. The luminous flux of the incoherent light emitting through the first light path is less than that of the incoherent light emitting through the second light path.

8 Claims, 7 Drawing Sheets

(58) Field of Classification Search
CPC .................. B23K 26/0643; F21S 41/16; F21S 48/1145–1159; F21S 48/1241; F21S 48/1323; F21S 48/1329; F21S 48/214; F21S 48/215; F21S 48/2225–2293; F21S 48/234; F21S 48/236; G03B 21/203; G03B 21/2033; G03B 21/204; G03B 21/2066; G03B 21/28; F21Y 2115/30; F21K 9/61; F21K 9/64; F21K 9/68; F21K 9/65; G02B 26/008; G02B 27/0916; G02B 27/0927; G02B 27/0983; G02B 27/48
See application file for complete search history.

(56) References Cited

U.S. PATENT DOCUMENTS

| | | | |
|---|---|---|---|
| 5,414,600 A | 5/1995 | Strobl et al. | |
| 7,070,300 B2 | 7/2006 | Harbers et al. | |
| 2002/0070688 A1 | 6/2002 | Dowling et al. | |
| 2003/0128341 A1 | 7/2003 | Li | |
| 2003/0198050 A1* | 10/2003 | Yamazaki | H04N 9/3152 |
| | | | 362/268 |
| 2004/0232812 A1 | 11/2004 | Beeson et al. | |
| 2005/0105301 A1 | 5/2005 | Takeda et al. | |
| 2005/0195340 A1 | 9/2005 | Lazarev | |
| 2009/0066916 A1 | 3/2009 | Brown | |
| 2009/0284148 A1 | 11/2009 | Iwanaga | |
| 2009/0296368 A1 | 12/2009 | Ramer | |
| 2011/0013145 A1 | 1/2011 | Kato | |
| 2011/0044070 A1 | 2/2011 | Takahashi | |
| 2011/0063115 A1* | 3/2011 | Kishimoto | F21S 41/176 |
| | | | 340/600 |
| 2011/0148280 A1* | 6/2011 | Kishimoto | F21S 45/70 |
| | | | 313/483 |
| 2011/0199580 A1 | 8/2011 | Hirata et al. | |
| 2011/0249436 A1 | 10/2011 | Li | |
| 2011/0280033 A1 | 11/2011 | Kishimoto et al. | |
| 2012/0106126 A1* | 5/2012 | Nojima | G03B 33/08 |
| | | | 362/84 |
| 2012/0106189 A1 | 5/2012 | Takahashi et al. | |
| 2013/0242273 A1* | 9/2013 | Weichmann | G03B 21/2006 |
| | | | 353/84 |

FOREIGN PATENT DOCUMENTS

| | | |
|---|---|---|
| CN | 102155639 A | 8/2011 |
| CN | 102520570 A | 6/2012 |
| EP | 1505435 A1 | 2/2005 |
| JP | S62-31303 U | 2/1987 |
| JP | 2005-150041 A | 6/2005 |
| JP | 2007-531302 A | 11/2007 |
| JP | 2009-277516 A | 11/2009 |
| JP | 2010-170836 A | 8/2010 |
| JP | 2011-49338 A | 3/2011 |
| JP | 2011-65979 A | 3/2011 |
| JP | 2011-221502 A | 11/2011 |
| SU | 1624391 A1 | 1/1991 |

OTHER PUBLICATIONS

Chinese Office Action, dated Apr. 6, 2016 in a counterpart Chinese patent application, No. CN 201510254328.0.
Japanese Office Action, dated Mar. 1, 2016 in a counterpart Japanese patent application, No. JP 2014-543753.
Japanese Office Action, dated Oct. 25, 2016 in a counterpart Japanese patent application, No. JP 2014-543753.
Korean Office Action, dated Jan. 23, 2017 in a counterpart application KR 10-2014-7013849.
International Search Report in the parent PCT application No. PCT/CN2012/080411, dated Dec. 6, 2012.
IPRP in the parent PCT application No. PCT/CN2012/080411, dated Jun. 10, 2014.
Extended European Search Report (Supplementary European Search Report and European Search Opinion) in counterpart application EP 12856400.2, dated Nov. 23, 2015.

* cited by examiner

LIGHT EMITTING DEVICE WITH DIFFUSER AND LIGHT REFLECTOR AND PROJECTION SYSTEM HAVING THE SAME

BACKGROUND OF THE INVENTION

Field of the Invention

This invention relates to the field of projectors, and in particular, it relates to a light emitting device and a projection system using the same.

Description of the Related Art

Traditional light sources such as fluorescent light, incandescent light, super-high performance light or xenon light cannot easily achieve high efficiency and long life. With the development of solid state light sources, light emitting diodes (LED) and semiconductor lasers are gradually entering the illumination and display market.

There are typically two ways to generate white light or color light: One is to directly use color light sources such as red, green or blue LED to provide color light, or to combine these color light to generate white light; the other is based on wavelength conversion, by exciting wavelength conversion materials (such as phosphors) with an excitation light to generate converted light, and then combining the excitation light or converted light to generate white light.

Taking phosphors as an example, conventional light sources that use wavelength conversion based method and LED chips typically provide the phosphor materials on a surface of the LED chip, so that the converted light that travels backwards through the phosphor layer and scatters toward the LED can be reflected by the LED chip to exit from the side of the phosphor layer, whereby the light output efficiency is enhanced. A shortcoming of this structure is that, the heat generated by the LED chip and the heat generated by the phosphor layer interfere with each other, which lowers the light emitting efficiency of the LED chip and the light conversion efficiency of the phosphor, and can even reduce the life of the LED device.

This shortcoming similarly exists in devices that directly use color light sources to provide color light. For example, when laser sources are directly used to provide color lights, because laser light is strongly coherent, the pixels in the projected image on the screen will show speckles due to coherency, so the image cannot be properly displayed. Therefore, in laser projectors, de-coherence devices or methods need to be used to eliminate the coherent speckles. In current technologies, to enhance light output efficiency, typically a diffusing element is disposed on the surface of the laser source, so that the light that travels backwards through the diffusing element toward the laser source can be reflected by the surface of the laser source to exit from the side of the diffusing element. However, the heat generated by the laser source and the heat generated by the diffusing element interfere with each other, which lowers the light emitting efficiency of the laser source, and can even reduce the life of the laser source.

To overcome the above shortcomings, U.S. Pat. No. 7,070,300 B2 describes a method that separates the LED and the phosphor materials, as shown in FIG. 1. An excitation light from one or more LED source 102 is collimated by a collimating device 108, and a wavelength selection filter 110 reflects the excitation light to another collimating device 114 which focuses the light onto a phosphor plate 112. The converted light from the phosphor plate 112 passes through the wavelength selection filter 110 to become the output light of the light source. In this device, relying on the different wavelengths of the excitation light and the converted light, the light path of the excitation light and the converted light are separated using the wavelength selection filter 110; so that while increasing the light output efficiency, the converted light is prevented from traveling back to the LED chip. Therefore, the heat generated by the LED chip and by the phosphor will not interfere with each other, which solves the above-described problem of the conventional technology.

A problem of the technology scheme described in the above patent is that, if the phosphor is changed to a diffusing element for eliminating coherency, because the coherent light and incoherent light have the same wavelength, the incoherent light emitted from the diffusing element toward the coherent light source will travel back to the coherent light source along the same path of the coherent light, so the incoherent light cannot be output from the light source device. Thus, the goal of increasing light output efficiency and the goal of reducing interference of the heat generated by the coherent light source and the diffusing element are in conflict with each other, and both goals cannot be achieved at the same time.

SUMMARY OF THE INVENTION

The present invention solves the above problem of the conventional technology, by providing a light emitting device and a projection system employing the same which improves light output efficiency; at the same time, most of the incoherent light from the diffusing element travelling toward the coherent light source will not return to the coherent light source along the same path of the coherent light, so that the interference of the heat generated by the laser source and the heat generated by diffusing element is reduced.

The present invention provides a light emitting device, which includes:

a coherent light source for emitting a coherent light;

a diffusing element having a first surface and a second surface opposite each other, for diffusing the coherent light from the coherent light source to generate an incoherent light; and a light guide element disposed on the side of the first surface of the diffusing element, for guiding the coherent light emitted by the coherent light source to incident on the first surface of the diffusing element to form a first light path, and for guiding a portion of the incoherent light from the first surface of the diffusing device to exit via the first light path, for guiding a remaining portion of the incoherent light from the first surface of the diffusing device to exit via a second light path, and for separating the first and second light paths;

further, the luminous flux of the incoherent light exiting via the first light path is less than the luminous flux of the incoherent light exiting via the second light path.

The present invention also provides a projection system that includes the above light emitting device.

Compared to conventional technology, the present invention has the following advantages:

In embodiments of the present invention, by using the light guide element to guide the coherent light to the diffusing element via the first light path, and to guide a majority of the incoherent light from the first surface of the diffusing element to become output of the light emitting device via a second light path that is separate from the first light path, the output efficiency of the light emitting device is enhanced, and at the same time, the majority of the incoherent light form the first surface of the diffusing element will not return to the coherent light source along the light path of the coherent light, so that the inference between the heat generated by the incoherent light and the heat generated by the coherent light source is reduced. This improves the light emitting efficiency and life of the coherent light source.

DETAILED DESCRIPTION OF THE PREFERRED EMBODIMENTS

To solve technical problems of the conventional technologies, embodiments of the present invention provide a light emitting device, which includes: a coherent light source for generating a coherent light; a diffusing element having a first surface and a second surface opposite each other, for diffusing the coherent light from the coherent light source to generate an incoherent light; and a light guide element disposed on the side of the first surface of the diffusing element, for guiding the coherent light emitted by the coherent light source to incident on the first surface of the diffusing element to form a first light path, for guiding a portion of the incoherent light from the first surface of the diffusing device to exit via the first light path, for guiding a remaining portion of the incoherent light from the first surface of the diffusing device to exit via a second light path, and for separating the first and second light paths; further, the luminous flux of the incoherent light exiting via the first light path is less than the luminous flux of the incoherent light exiting via the second light path.

Considering the near Lambertian distribution characteristics of the incoherent light scattered by the diffusing element, and the relatively small etendue of the coherent light incident on the diffusing element form the coherent light source, embodiments of the present invention takes advantage of the difference in etendue between the coherent light source and the diffusing element. It uses the light guide element to guide the input light path of the coherent light into the output light path of the diffusing element, and at the same time, limits the luminous flux of the incoherent light guided by the light guiding device and exiting via the first light path to be smaller than the luminous flux of the incoherent light exiting via the second light path. This way, the majority of the incoherent light from the first surface of the diffusing element (i.e. the majority of the incoherent light emitted from the diffusing element toward the coherent light source) exits via the second light path, instead of escaping excessively via the first light path, i.e., it will not return to the coherent light source along the input path of the coherent light. Therefore, the interference between the heat generated by the coherent light source and the heat generated by the diffusing element is reduced, and the light emitting efficiency and life of the coherent light source are improved.

Figure 1:
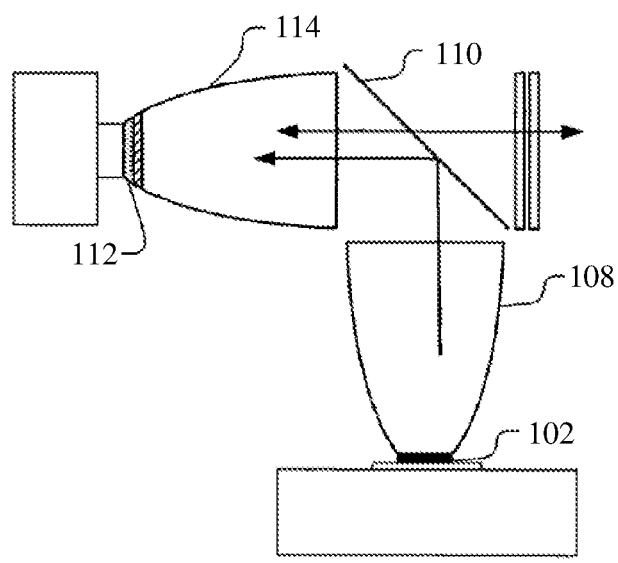
FIG. 1 illustrates the structure of a conventional light source which uses LED and phosphor to generate highly efficient color lights.
Figure 2:
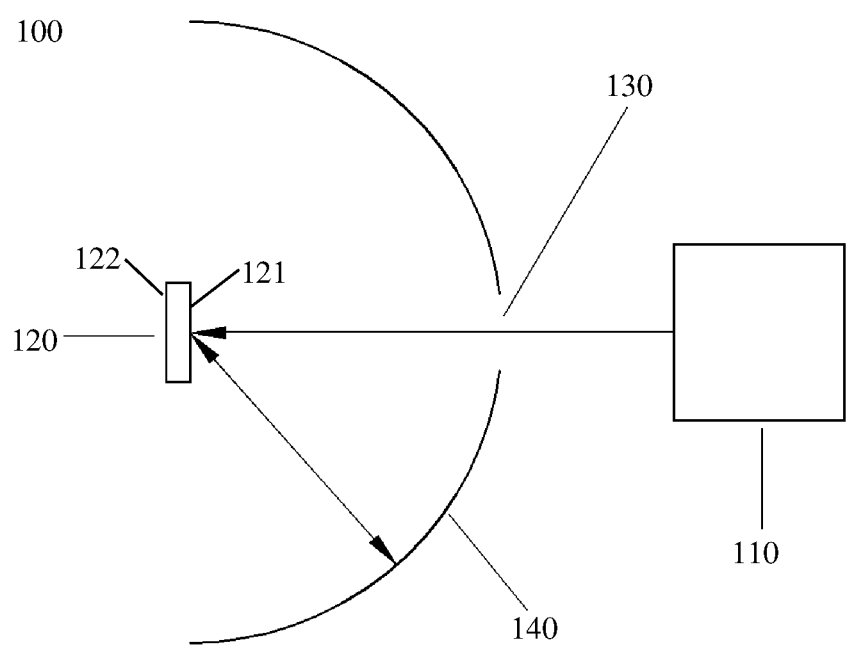
FIG. 2 illustrates the structure of a light emitting device according to an embodiment of the present invention.

Referring to FIG. 2, which illustrates the structure of a light emitting device according to an embodiment of the present invention. As shown in FIG. 2, in this embodiment, the light emitting device 100 includes a coherent light source 110 for generating a coherent light, a diffusing element 120 for scattering the coherent light form the coherent light source 110 to generate an incoherent light, and a light guide element 140. The diffusing element 120 includes a first surface 121 and a second surface 122 opposite each other. The light guide element 140 is disposed on the side of the first surface 121, i.e. the first surface 121 of the diffusing element is closer to the light guide element 140 than the second surface is.

To ensure that the coherent light source has a relatively small etendue, the coherent light source 110 is preferably a laser diode. The coherent light source can also be light emitting diodes or other types of light sources. A light homogenizing device which smoothes and shapes the light can be used to guide the coherent light from the coherent light source 110 to the light guide element 140. The light homogenizing device may be a fly-eye lens array or a hollow or solid light rod.

The scattering mechanisms of diffusing elements typically include volume scattering and surface scattering. Surface scattering diffusing element achieve scattering by using surface microstructures of a transparent material to refract and reflect light. Such diffusing elements can be divided into single-sided microstructure and double-sided microstructure. The microstructures may be formed by sandblasting the surface of a glass substrate, or by chemical corrosion of a glass surface, or by heat-press forming on a plastic substrate. If a single-sided microstructure diffusing device is used, preferably, the coherent light is incident onto the surface that has the microstructures (i.e. the first surface is the surface with microstructures) and exits from the smooth surface. This achieves relatively high transmission rate. Volume scattering achieves diffusion by mixing micro particles that have different refractive indices or are opaque into the body of the diffusing element.

In this embodiment, the light guide element 140 is a second reflective element 140 that has an aperture 130 and a reflecting surface (not labeled in the drawing) surrounding the aperture. In this embodiment, the second reflective element 140 is specifically an arc shaped reflective element having the aperture 130 and the reflecting surface. The second reflective element 140 can also be a planar reflector, saw-tooth shaped reflecting device or a curved reflecting device of other shapes. These preferred shapes will be described in more detail later.

The aperture 130 guides the coherent light from the coherent light source 110 by transmission onto the first surface 121 of the diffusing element 120 to form the first light path, and guides a portion of the incoherent light from the first surface 121 of the diffusing element 120 to exit via the first light path. The reflective surface of the second reflective element 140 is used to guide the remaining incoherent light from the first surface 121 by reflection to exit via the second light path. The incoherent light reflected by the reflective surface of the second reflective element 140 and the incoherent light from the second surface 122 of the diffusing element 120 together constitute the output light of the light emitting device 100, so that the light output efficiency of the light emitting device is increased. An optical element may be provided at the output end of the light emitting device to collect, smooth and shape the incoherent light.

Further, the second reflective element 140 separates the first light path and the second light path using the aperture 130 and the reflective surface. Specifically, the first light path is from the diffusing element 120, via the aperture 130 of the second reflecting device 140, to the coherent light source 110; the second light path is from the diffusing element 120 via the reflective surface of the second reflecting device 140, and reflected by the reflective surface to travel away from the coherent light source 110, so as to be separated from the first light path. By separating the first and second light paths, the light output efficiency of the light emitting device is improved, and at the same time, the incoherent light exiting via the second light path will not return to the coherent light source along the first light path.

Because the etendue of the coherent light emitted by the coherent light source 110 is relatively small, and the incoherent light after scattering by the diffusing element 120 has a near Lambertian distribution and has an etendue much larger than that of the coherent light, the area ratio of the aperture 130 of the second reflective element 140 to the reflective surface can be controlled to be a relatively small value, so that the majority of the incoherent light from the first surface 121 of the diffusing element can be reflected by the reflective surface of the second reflective element 140 to become output and be effectively utilized, while a small portion of the incoherent light leaks through the aperture 130 and become lost. The ratio of lost light is within an acceptable range. Preferably, the area of the aperture of the second reflective element 140 is less than or equal to ¼ of the area of the reflective surface of the second reflecting device 140.

Compared to conventional technologies, in the present embodiment, by using the aperture 130 of the light guide element 140 to guide the coherent light along the first light path to the diffusing element 120, and by using the reflective surface of the light guide element 140 to guide the majority of the incoherent light from the first surface of the diffusing element 120 to exit via the second light path which is separate from the first light path and become the output of the light emitting device, the light output efficiency of the light emitting device is improved, and at the same time, the majority of the incoherent light from the first surface 121 of the diffusing element will not return to the coherent light source along the same path of the coherent light, so that the interference between the heat generated by the coherent light source and the heat generated by incoherent light is reduced, which improves the light emitting efficiency and life of the coherent light source.

Figure 3:
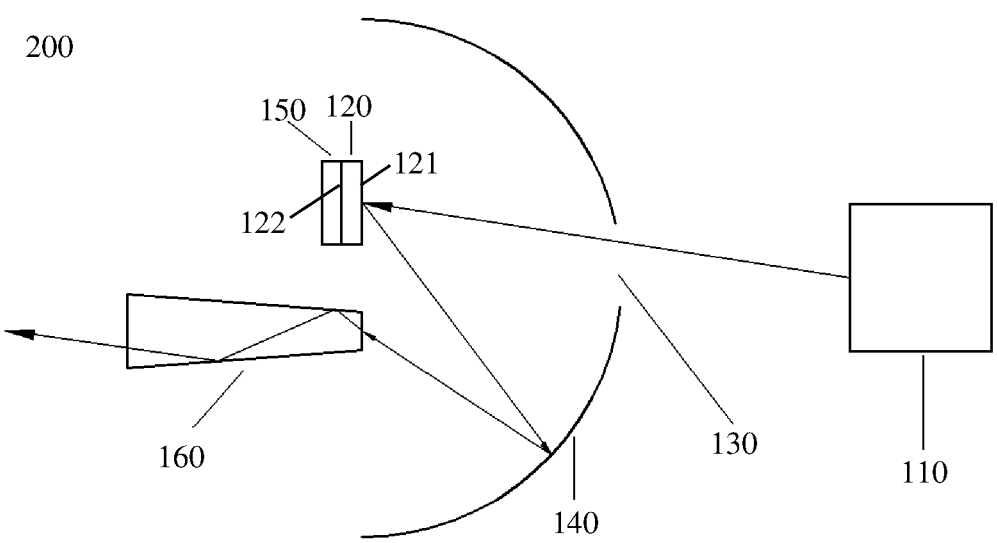
FIG. 3 illustrates the structure of a light emitting device according to another embodiment of the present invention.

Referring to FIG. 3, which illustrates the structure of a light emitting device according to another embodiment of the present invention. A main difference from the embodiment of FIG. 2 is that, in this embodiment, the light emitting device 200 additionally includes a first reflective element 150 and a light collecting device 160. The first reflective element 150 reflects the incoherent light from the second surface 122 of the diffusing element 120 toward the second reflective element 140, so that all of the incoherent light from the diffusing element travel toward the second reflective element 140. In this embodiment, the diffusing element 120 is a transmission type diffusing element as an example. To ensure that all incoherent light from the diffusing element travel toward the second reflective element 140, the first reflective element 150 is needed to reflect the incoherent light from the second surface 122 of the diffusing element. In other embodiments, the first reflective element 150 may be omitted; rather, by increasing the thickness of the diffusing element 120, the incoherent light generated from the coherent light by the first surface of the diffusing element cannot penetrate to the second surface of the diffusing element, so that all the incoherent light generated by the diffusing element exits the first surface toward the second reflective element 140.

Preferably, the second reflective element 140 is a hemisphere or a part thereof. The location where the coherent light is incident on the diffusing element 120 is at a first point near the spherical center of the hemisphere, and the light input port of the light collecting device 160 is located at a second point near the spherical center, where the first point and second point are symmetrical with respect to the spherical center. The coherent light from the coherent light source 110 is incident on the diffusing element 120 through the aperture 130. The incoherent light from the second surface 122 of the diffusing element 120 is reflected by the first reflective element 150, and travels toward the light guide element 140 together with the incoherent light from the first surface 121 of the diffusing element. The reflective surface of the second reflective element 140 reflects a majority of the incoherent light to the light input port of the light collecting device located at the second point near the spherical center. The majority of the incoherent light is collected by the light collecting device 160 and output as the output light of the light emitting device 200. Meanwhile, a small portion of the incoherent light from the diffusing element 120 transmits through the aperture of the second reflective element 140 and become lost.

Preferably, the aperture 130 is an offset aperture of the hemisphere shaped second reflective element 140, so that the coherent light from the coherent light source 110 is incident on the diffusing element 120 perpendicularly. This way, if the diffusing element 120 falls off of the first reflective element 150, the coherent light will be reflected by the first reflective element 150 back into the aperture 130 of the second reflective element 140 and back to the coherent light source, and will not be reflected to the reflective surface of the second reflective element 140 and become output to the light collecting device, which can harm the human eyes.

Preferably, the second reflective element 140 may also be a semi-ellipsoid of a part thereof. The location where the coherent light is incident on the diffusing element 120 is at the first focal point of the semi-ellipsoid, and the light input port of the light collecting device 160 is located at the second focal point of the semi-ellipsoid. A majority of the incoherent light from the diffusing element is reflected by the reflective surface of the second reflective element 140 to the second focal point of the semi-ellipsoid, and is collected by the light collecting device 160 and output as the output light of the light emitting device 200. Similarly, the aperture 130 is preferably an offset aperture of the semi-ellipsoid shaped second reflective element 140 so that the coherent light from the coherent light source 110 is incident on the diffusing element 120 perpendicularly.

More specifically, in this invention, the second reflective element 140 is the reflective wall of a hollow structure that has an aperture. The reflective wall has a reflective coating coated on the inner surface, and the aperture is an opening on the reflective wall. It should be understood that the reflective coating can also be coated on the outer surface of the reflective wall.

Further, in this embodiment, the light collecting device 160 is a hollow light guide. In fact, the light collecting device 160 of this embodiment can also be a lens, lens set, hollow light guide, solid light guide, hollow compound parabolic concentrator, solid compound parabolic concentrator, or their combinations.

Figure 4:
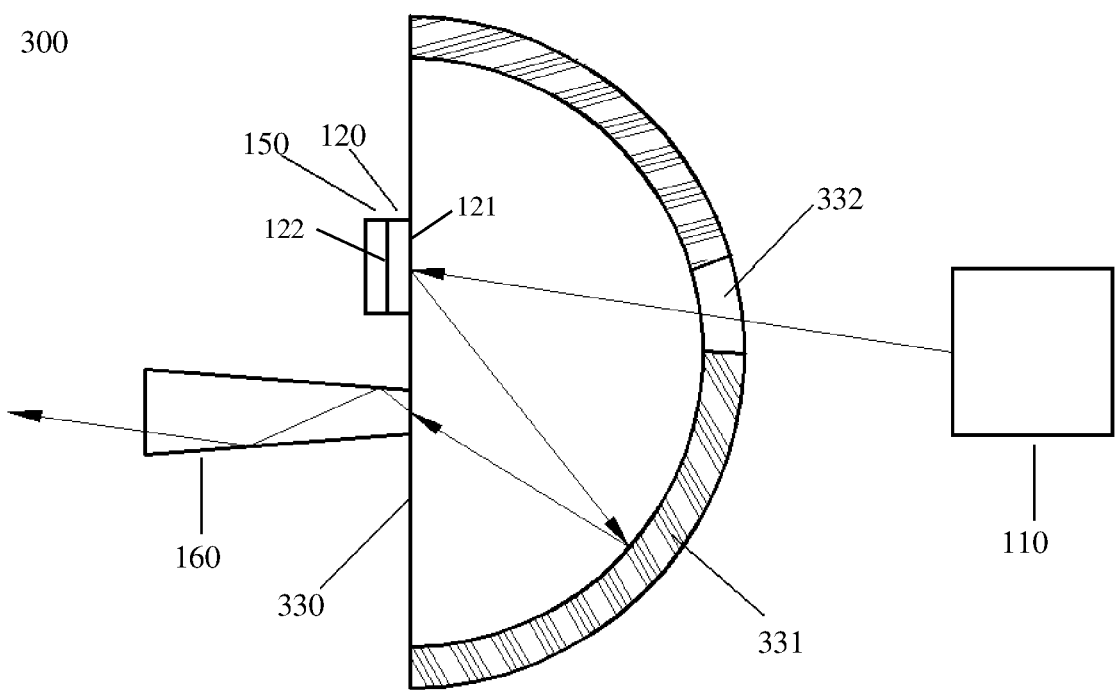
FIG. 4 illustrates the structure of a light emitting device according to another embodiment of the present invention.

Referring to FIG. 4, which illustrates the structure of a light emitting device according to another embodiment of the present invention. One difference from the embodiment of FIG. 3 is that, in this embodiment, the second reflective element 140 of the light emitting device 300 is a solid transparent body 330 coated with a reflective coating 331 on its outer curved surface, and the aperture 332 is an opening 332 in the reflective coating 331. Preferably, there is an air gap between the diffusing element 120 and the solid transparent body 330 (not shown in the drawing), to increase the output brightness of the light emitting device. Similar to the embodiment of FIG. 3, the solid transparent body 330 is preferably a hemisphere or semi-ellipsoid. Here, the air gap between the diffusing element 120 and the solid transparent body 330 has a thickness preferably less than 1% of the radius of the hemisphere or 1% of the longest semi-principle axis of the semi-ellipsoid, which can effectively increase the output brightness of the light emitting device.

Figure 5:
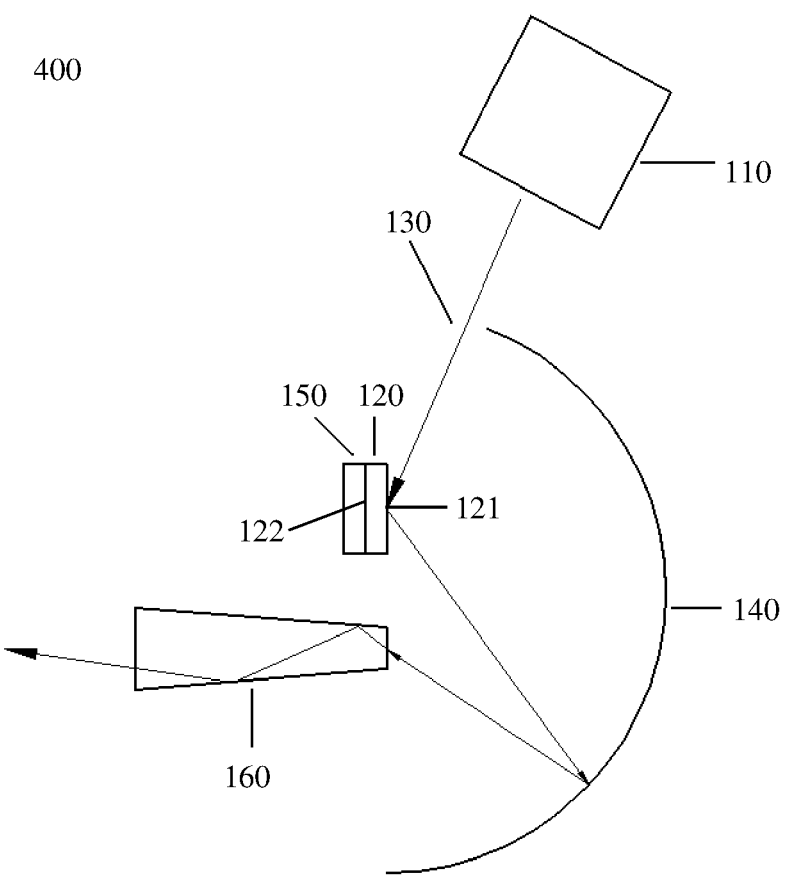
FIG. 5 illustrates the structure of a light emitting device according to another embodiment of the present invention.
Figure 13:
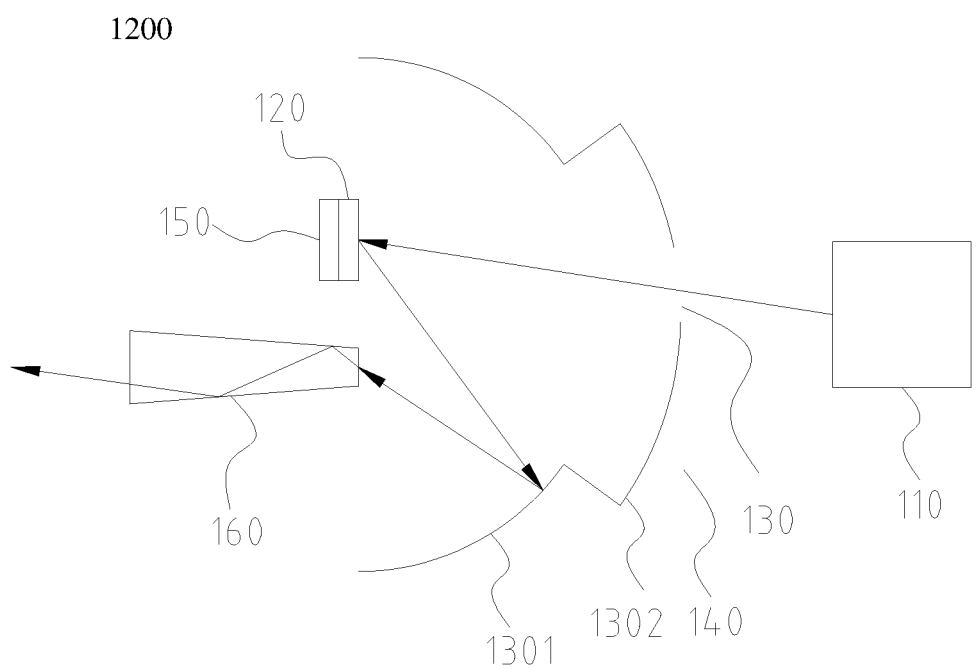
FIG. 13 illustrates the structure of a light emitting device according to another embodiment of the present invention.

Referring to FIG. 5, which illustrates the structure of a light emitting device according to another embodiment of the present invention. One difference because this embodiment and the embodiment of FIG. 3 is that, in the light emitting device 400, the aperture 130 is a gap on the edge of the second reflective element 140, and the coherent light from the coherent light source 110 is incident on the diffusing element 120 through the gap. It should be understood that the second reflective element 140 of this embodiment may be a solid transparent body coated with a reflective coating on its outer curved surface Referring to FIG. 13, which illustrates the structure of a light emitting device according to another embodiment of the present invention. One difference because this embodiment and the embodiment of FIG. 3 is that, in the light emitting device 1200, the second reflective element 140 is a saw-tooth shaped reflective element, which includes two saw-tooth surfaces 1301 and 1302, each being a part of a set of concentric spheres. It can be understood with reference to the illustration of FIG. 3 that, the saw-tooth surfaces 1301 and 1302 can respectively function as an arc shaped reflective element, so the saw-tooth shaped reflective element can be considered a nested combination of a set of arc shaped reflective element s, which has the same reflecting effect as one arc shaped reflective element with respect to the incoherent light from the first surface of the diffusing element. A difference between the saw-tooth shaped reflective element and an arc shaped reflective element is that, the saw-tooth shaped reflective element occupies a smaller space and has a more compact structure.

Figure 6:
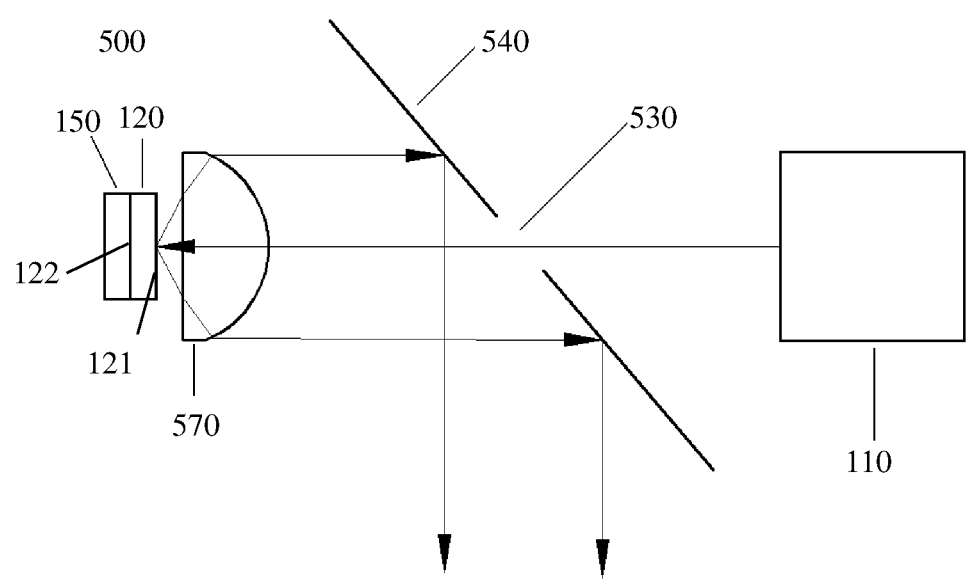
FIG. 6 illustrates the structure of a light emitting device according to another embodiment of the present invention.

Referring to FIG. 6, which illustrates the structure of a light emitting device according to another embodiment of the present invention. One difference from the embodiment of FIG. 3 is that, in this embodiment, the second reflective element of the light emitting device 500 is a planar reflective element 540 having an aperture 530 and a reflective surface surrounding the aperture 530. The planar reflective element 540 reflects the incoherent light from the diffusing element so that the incoherent light is output in a direction which is at an angle relative to the coherent light.

Because the incoherent light has a near Lambertian distribution, preferably, this embodiment further includes a lens set 570 to collect the incoherent light from the diffusing element 120 and collimate it onto the planar reflective element 540. A majority of the collimated incoherent light is reflected by the reflective surface of the planar reflective element 540 and becomes the output light of the light emitting device 500. More preferably, the projection area of the aperture 530 on the output light spot of the lens set 570 is less than ¼ of the area of the output light spot, so as to reduce the amount of incoherent light leaked out through the aperture 530 and to increase the light output efficiency of the light emitting device 500. It should be understood that, other light collecting devices described earlier can be used to replace the lens set 570 in order to collect the incoherent light from the diffusing element 120 and relay it to the planar reflective element 540.

In addition, an optical elements may be provided at the output end of the light emitting device 500 to collect, smooth and shape the incoherent light, which will not be described in more detail here.

Figure 7:
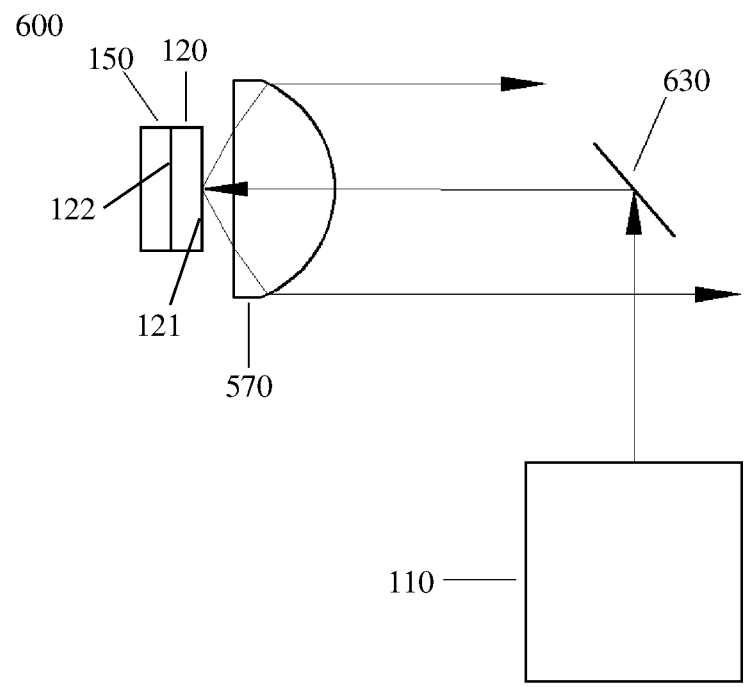
FIG. 7 illustrates the structure of a light emitting device according to another embodiment of the present invention.

Referring to FIG. 7, which illustrates the structure of a light emitting device according to another embodiment of the present invention. One difference from the embodiment of FIG. 6 is that, in this embodiment, the light guide element of the light emitting device 600 includes a third reflective element 630 and a transparent medium surrounding the third reflective element 630 (in this embodiment, the transparent medium is specifically air surrounding the third reflective element 630). The third reflective element 630 is used to guide the coherent light from the coherent light source 110 by reflection to incident onto the first surface of the diffusing element 120 to form a first light path, and to guide a portion of the incoherent light from the first surface of the diffusing element 120 to exit via the first light path; the transparent medium surrounding the third reflective element 630 guides the remaining portion of the incoherent light from the first surface of the diffusing element 120 by transmission to exit via a second light path, where the incoherent light exiting via the second light path constitutes the output light of the light emitting device 600. The light guide element separates the first and second light paths by using the third reflective element 630 and the transparent medium.

Similar to the embodiment of FIG. 6, preferably, this embodiment further includes a lens set 570 to collect and collimate the incoherent light form the first surface of the diffusing element 120. More preferably, the projection area of the third reflective element 630 on the output light spot of the lens set is less than ¼ of the area of the output light spot, so as to reduce the amount of incoherent light leaked by reflection of the third reflective element 630, and increase the light output efficiency of the light emitting device 600. It should be understood that, other light collecting devices described earlier can be used to replace the lens set 570, the light collecting device being located between the diffusing element 120 and the third reflective element 630, in order to collect and relay the incoherent light from the first surface of the diffusing element 120. An optical elements may be provided at the output end of the light emitting device 600 to collect, smooth and shape the incoherent light, which will not be described in more detail here.

Figure 8:
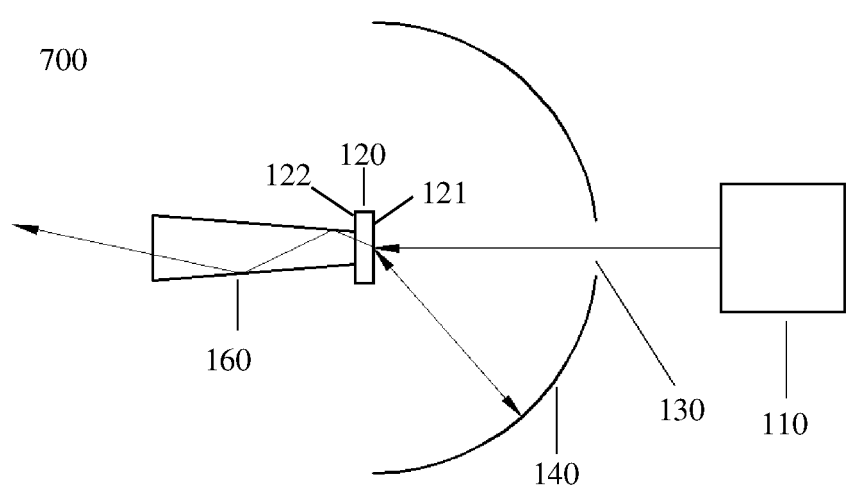
FIG. 8 illustrates the structure of a light emitting device according to another embodiment of the present invention.

Referring to FIG. 8, which illustrates the structure of a light emitting device according to another embodiment of the present invention. In this embodiment, the light guide element of the light emitting device 700 includes a second reflective element 140 having an aperture 130 and a reflective surface surrounding the aperture. The aperture 130 guides the coherent light from the coherent light source 110 by transmission onto the first surface of the diffusing element 120 to form the first light path, and guides a portion of the incoherent light from the first surface of the diffusing element 120 to exit via the first light path. Different from the embodiment of FIG. 3, in this embodiment, the first reflective element 150 is not provided; the incoherent light generated by the diffusing element 120 which travels toward its second surface directly exits the second surface to become the output light of the light emitting device. The reflective surface of the second reflective element 140 guides the incoherent light from the first surface 121 of the diffusing element 120 by reflection back to the first surface 121 of the diffusing element 120; this incoherent light transmits the diffusing element and exits the second surface 122 of the diffusing element 120 to become the output light of the light emitting device.

Preferably, the second reflective element 140 is an arc shaped reflective element having an aperture and a reflecting surface surrounding the aperture. The arc shaped reflector has a hemispherical shape, and the location where the coherent light is incident on the diffusing element 120 is at the spherical center. The incoherent light from the first surface of the diffusing element 120 travels towards the second reflective element 140, which reflects a majority of the incoherent light towards the diffusing element 120 located at the spherical center. Further, this embodiment includes a light collecting device 160; the light input port of the light collecting device 160 is located on the side of the second surface of the diffusing element 120 (i.e., the second surface 122 is closer to the light collecting device 160 than the first surface 121 is), for collecting the incoherent light from the diffusing element 120.

In addition, more specifically, the second reflective element 140 of this embodiment is the reflective wall of a hollow structure that has an aperture. The reflective wall has a reflective coating coated on the inner surface, and the aperture is an opening on the reflective wall. It should be understood that the second reflective element 140 can also be a saw-tooth shaped reflective element, which includes at least two saw-tooth surfaces each being a part of a set of concentric spheres, where the diffusing element is located at the spherical center of the concentric spheres.

Figure 9:
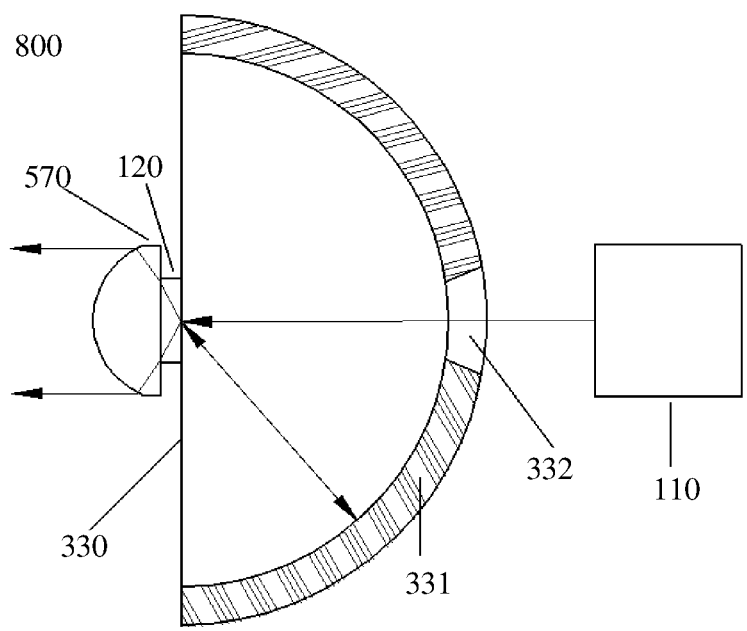
FIG. 9 illustrates the structure of a light emitting device according to another embodiment of the present invention.

Referring to FIG. 9, which illustrates the structure of a light emitting device according to another embodiment of the present invention. One difference from the embodiment of FIG. 8 is that, in this embodiment, the second reflective element of the light emitting device 800 is a solid transparent body 330 coated with a reflective coating 331 on its outer curved surface, and the aperture 332 is an opening 332 in the reflective coating 331. Preferably, the solid transparent body 330 has a hemispherical shape, and there is an air gap between the diffusing element 120 and the solid transparent body 330. The air gap has a thickness preferably less than 1% of the radius of the hemisphere or 1% of the longest semi-principle axis of the semi-ellipsoid, which can effectively increase the output brightness of the light emitting device.

Preferably, this embodiment further includes a lens set 570 disposed on the side of the second surface of the diffusing element 120, so that the incoherent light from the diffusing element 120 is collimated by the lens set 570 and outputted. In fact, the other types of light collection devices described earlier may be used to replace the lens set 570.

Further, other embodiments of the present invention modify the above-described embodiments; i.e., the light emitting device additionally includes a driving device for driving the diffusing element, so that the illumination spot of the coherent light incident on the diffusing element acts upon the diffusing element along a predetermined path. This can avoid the high temperature of the diffusing element caused by the coherent light incident on the same location of the diffusing element for a long time period, and can increase the useful life of the diffusing element. Preferably, the driving device may be a rotating plate, and the diffusing element may be mounted on the rotating plate, so that the diffusing element moves with the rotating plate in a circular manner, and the light spot of the coherent light incident on the diffusing element acts upon the diffusing element along a circular path. Of course, the driving device may drive the diffusing element to move in other ways, such as a linear motion.

Figure 10A:
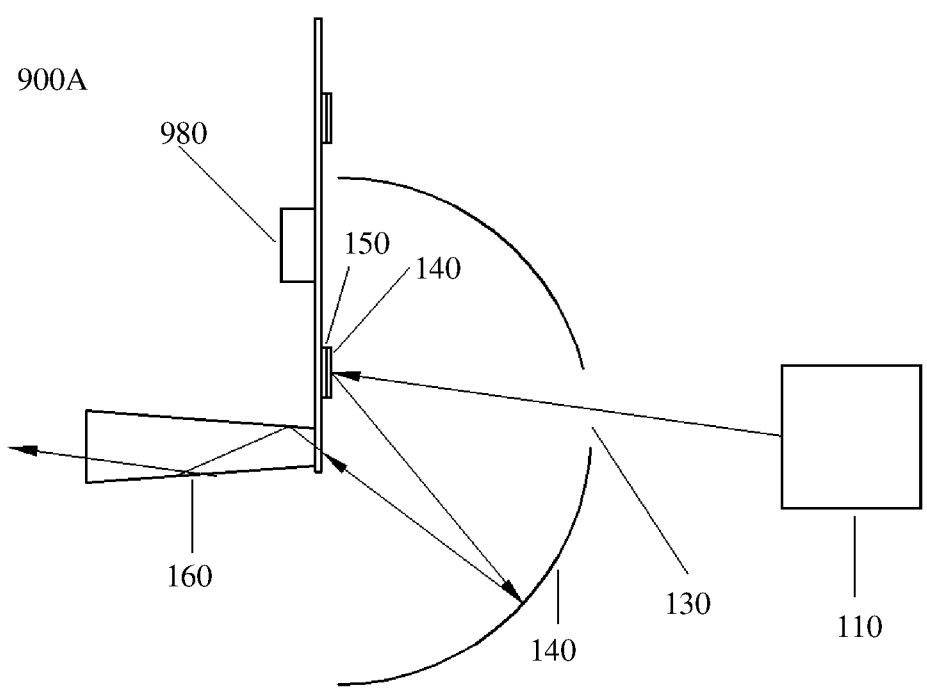
FIG. 10A illustrates the structure of a light emitting device according to another embodiment of the present invention.

Referring to FIG. 10A, which illustrates the structure of a light emitting device according to another embodiment of the present invention. The embodiment of FIG. 10A is another reflective-type embodiment, modified based on the embodiment of FIG. 3. The light emitting device 900A of this embodiment further includes a rotating plate 980. Both the diffusing element 120 and the first reflective element 150 are ring shapes which are concentric with the rotating plate; they are disposed on the rotating plate 980 and rotate with it. The first reflective element 150 is located between the driving device 980 and the diffusing element 120. The first reflective element 150 may also be a part of the rotating plate 980. The incoherent light reflected by the reflecting surface of the second reflective element 140 transmits through the rotating plate 980 and is collected by the light collecting device 160 for output. The light collecting device 160 can also be located on and extension line outside of the periphery of the rotating plate 980, i.e., the incoherent light reflected by second reflective element can be incident directly into the light collecting device 160 without passing through the rotating plate 980.

Figure 10B:
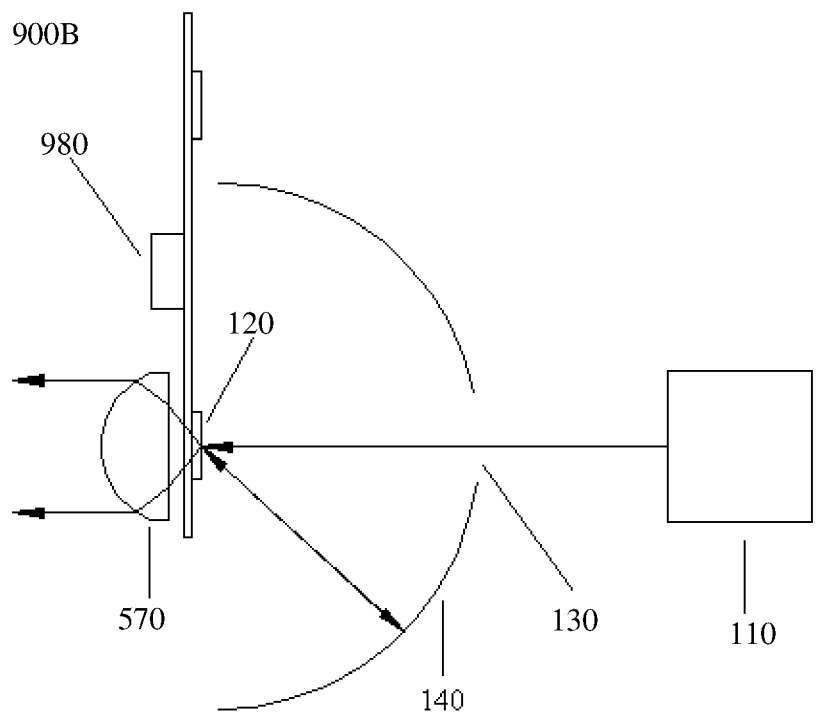
FIG. 10B illustrates the structure of a light emitting device according to another embodiment of the present invention.

Referring to FIG. 10B, which illustrates the structure of a light emitting device according to another embodiment of the present invention. The embodiment of FIG. 10A is another reflective-type embodiment, modified based on the embodiment of FIG. 8. The light emitting device 900B of this embodiment further includes a rotating plate 980. The diffusing element 120 is a ring shape which is concentric with the rotating plate; it is disposed on the rotating plate 980 and rotates with it. The region of the rotating plate 980 which carries the diffusing element 120 is formed of a transparent material, so that a portion of the incoherent light from the diffusing element directly transmits through the rotating plate 980 to be output, while another portion of the incoherent light is reflected by the reflecting surface of the second reflective element 140 back to the diffusing element, and exits its second surface and the rotating plate 980 to be output. This embodiment further includes a lens set 570, located on the side of the second surface of the diffusing element. The lens set 570 collimates the incoherent light and outputs it.

Further, another embodiment of the present invention provides a light emitting device where the coherent light source includes at least two sub-light sources respectively for generating at least two colored lights, and a light combining device for combining the light from the at least two sub-light sources into one light beam. This embodiment is described in more detail below.

Figure 11:
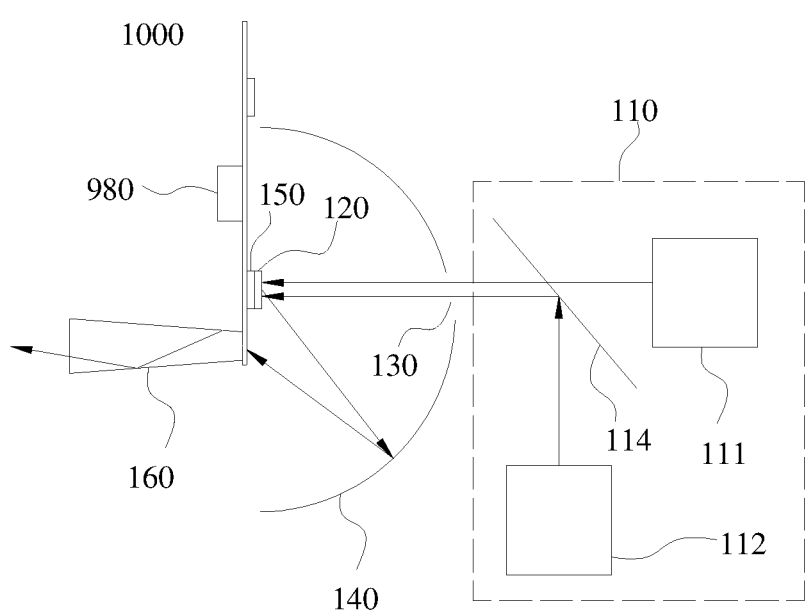
FIG. 11 illustrates the structure of a light emitting device according to another embodiment of the present invention.

Referring to FIG. 11, which illustrates the structure of a light emitting device according to another embodiment of the present invention. One difference between this embodiment and the embodiment of FIG. 10A is that, in the light emitting device 1000, the coherent light source 110 includes a first sub-light source 111 and a second sub-light source 112. The first sub-light source 111 is a laser diode generating a red light, and the second sub-light source 112 is a laser diode generating a green light. The light emitting device 1000 additionally includes a light combining device 114, which combines the lights respectively generated by the first sub-light source 111 and the second sub-light source 112 into one combined light beam. The combined light beam is incident on the diffusing element 120 via the aperture 130.

More specifically, in this embodiment, the light combining device 114 is a dichroic filter that transmits red light and reflects green light. The red coherent light from the first sub-light source 111 transmits through the light combining device 114 to reach the aperture 130, while the green coherent light from the second sub-light source 112 is reflected by the light combining device 114 to reach the aperture 130. Of course, the light combining device 114 can also be a dichroic filter that reflects ref light and transmits green light, so that the red coherent light from the first sub-light source 111 is reflected to reach the aperture 130, and the green coherent light from the second sub-light source 112 is transmitted to reach the aperture 130. Therefore, the red coherent light and the green coherent light are combined into one light beam.

The red coherent light and green coherent light can simultaneously pass through the aperture 130, and the output light of the light emitting device 1000 is a yellow incoherent light formed by the red incoherent light and the green incoherent light. Similarly, in another embodiment of the light emitting device, the coherent light source may further include a third sub-light source, such as a laser diode generating a blue coherent light. The light combining device may be a dichroic filter set formed in a cross shape, to combined the coherent lights from the first, second and third sub-light sources into one combined light beam and to guide it through the aperture 130. This light emitting device can output a white incoherent light formed by combining the red, green and blue incoherent light.

In the above embodiments, the coherent light sources 110 are light sources that generate one color light (such as blue of yellow), and the light emitting device output one color incoherent light. The present invention may also be applied in situations that require a multiple color light sequence output. Therefore, another embodiment of the present invention provides a light emitting device, which further includes a control device for respectively controlling the on and off as well as light intensities of the two sub-light sources of the coherent light source.

Figure 12:
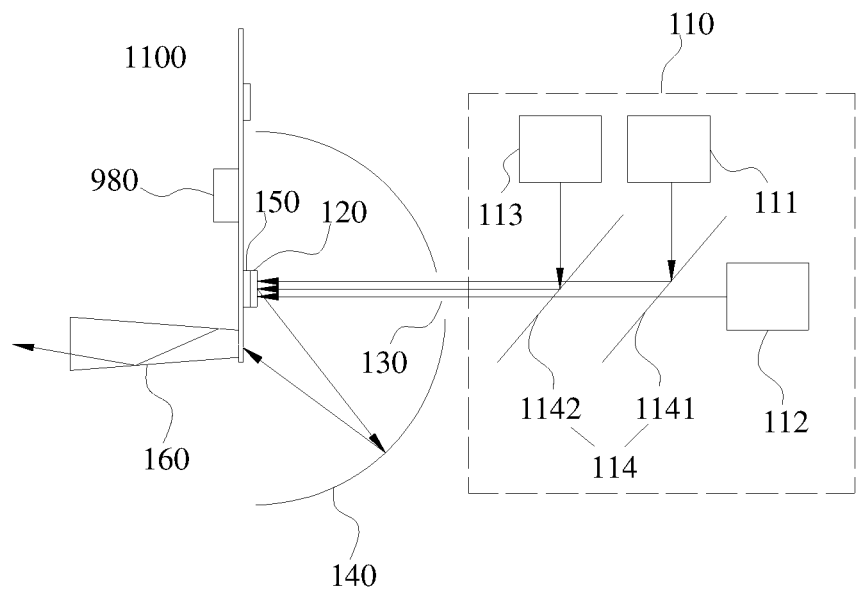
FIG. 12 illustrates the structure of a light emitting device according to another embodiment of the present invention.

Referring to FIG. 12, which illustrates the structure of a light emitting device according to another embodiment of the present invention. One difference between this embodiment and the embodiment of FIG. 11 is that, the coherent light source 110 of the light emitting device 1100 further includes a third sub-light source 113, which is a laser diode generating a blue coherent light. The light combining device 114 is a dichroic filter set, including two dichroic filter plates 1141 and 1142 disposed in parallel to each other. The dichroic filter set 114 combines the light from the first, second and third sub-light sources into one combined light beam. The combined light beam passes through the aperture 130 to incident on the diffusing element 120. Specifically, the dichroic filter plate 1141 reflects the red coherent light generated by the first sub-light source 111 and transmits the green coherent light generated by the second sub-light source 112, and both the red and green coherent light transmits through the dichroic filter plate 1142; the dichroic filter plate 1142 reflects the blue coherent light generated by the third sub-light source 113.

The light emitting device 1100 further includes a control device (not shorn in the drawing), for respectively controlling the on and off as well as light intensities of the three sub-light sources of the coherent light source. For example, the control device may control the three sub-light sources that generate red, green and blue coherent light to turn on and off of in an order, so that the light emitting device outputs red, green and blue incoherent light in that order. The control device can also control the three sub-light sources that generate red, green and blue coherent light to turn on simultaneously, and control the light intensities of the three sub-light sources to change periodically, so that the color of the combined light generated by the light combining device changes periodically, and the light emitting device outputs an incoherent light whose color changes periodically.

The present invention also provides a projection system, including a light emitting device which may have the functions described in the above embodiments.

The above described embodiments of the present invention are exemplary only and do not limit the scope of the invention. Any equivalent structures and equivalent processes and variations based on the instant disclosure and drawings, or direct or indirect applications in other relevant technology areas, are all within the scope of patent protection of this invention.

What is claimed is:
1. A light emitting device, comprising:
  a coherent light source for emitting a coherent light;
  a diffusing element having a first surface and a second surface opposite each other, for diffusing the coherent light from the coherent light source to generate an incoherent light; and
  a reflective component disposed on a side of the first surface of the diffusing element, for guiding the coherent light emitted by the coherent light source to be incident on the first surface of the diffusing element to form a first light path, for guiding a portion of the incoherent light from the first surface of the diffusing device to exit via the first light path, for guiding a remaining portion of the incoherent light from the first surface of the diffusing device to exit via a second light path, and for separating the first and second light paths,
  wherein the reflective component includes a reflective element having an aperture and a reflective surface surrounding the aperture, wherein the aperture guides the coherent light from the coherent light source by transmission onto the first surface of the diffusing element to form the first light path, and guides the portion of the incoherent light from the first surface of the diffusing element to exit via the first light path, and wherein the reflective surface of the reflective element reflects the incoherent light from the first surface by reflection back to the first surface of the diffusing element via the second light path, and wherein a luminous flux of the incoherent light exiting via the first light path is less than a luminous flux of the incoherent light exiting via the second light path; and a driving device for driving the diffusing element, so that an illumination spot of the coherent light incident on the diffusing element acts upon the diffusing element along a predetermined path.

2. The light emitting device of claim 1, wherein the luminous flux of the incoherent light exiting via the first light path is less than or equal to ¼ of the luminous flux of the incoherent light exit via the second light path.

3. The light emitting device of claim 1, wherein the reflective element is an arc shaped reflective element having the aperture and the reflective surface, wherein the arc shaped reflective element is a hemisphere or a saw-tooth shape, and wherein a location where the coherent light is incident on the diffusing element is at a spherical center of the hemisphere or the saw-tooth shape.

4. The light emitting device of claim 1, wherein the reflective element is an arc shaped reflective element having the aperture and the reflective surface, wherein the arc shaped reflective element is a reflective wall of a hollow structure that has an aperture, wherein the reflective wall has a reflective coating coated on the inner surface, and wherein the aperture is an opening on the reflective wall.

5. The light emitting device of claim 1, wherein the reflective element is an arc shaped reflective element having the aperture and the reflective surface, wherein the arc shaped reflective element is a solid transparent body coated with a reflective coating on its outer curved surface and having an aperture, wherein the aperture is an opening in the reflective coating.

6. The light emitting device of claim 5, wherein the diffusing element and the solid transparent body are separated by an air gap, wherein the air gap has a thickness less than 1% of a longest semi-principle axis of the semi-ellipsoid or 1% of a radius of the hemisphere.

7. The light emitting device of claim 1, wherein the coherent light source is a laser diode.

8. The light emitting device of claim 1, wherein the coherent light includes two sub-light sources respectively for generating two colored lights, and a light combining device for combining lights from the two sub-light sources into one light beam, the light emitting device further comprising a control device for respectively controlling on and off as well as light intensities of the two sub-light sources.

* * * * *